United States Patent [19]

Hutchinson et al.

[11] Patent Number: 5,235,177
[45] Date of Patent: Aug. 10, 1993

[54] ANGULAR POSITION SENSOR USING A POLARIZED DISC WITH CODED TRACKS

[75] Inventors: Paul L. Hutchinson, West Upton; W. Gordon White, deceased, late of Boston, both of Mass., by Adrienne Smith, administrator

[73] Assignee: Maximum, Inc., New Bedford, Mass.

[21] Appl. No.: 784,376

[22] Filed: Oct. 29, 1991

[51] Int. Cl.$^5$ .............................. G02F 1/01
[52] U.S. Cl. ................. 250/225; 250/231.13
[58] Field of Search ............ 250/231.13, 231.18, 250/225, 211 K; 356/373, 375

[56] References Cited

U.S. PATENT DOCUMENTS

| | | | |
|---|---|---|---|
| 3,867,629 | 2/1975 | Van Buskirk | 250/225 |
| 3,877,816 | 4/1975 | Weiss et al. | 356/138 |
| 3,932,039 | 1/1976 | Frey | 356/138 |
| 3,981,587 | 9/1976 | Gievers | 356/152 |
| 3,992,104 | 11/1976 | Watanabe | 356/117 |
| 4,072,281 | 2/1978 | Miller, Jr. et al. | 244/3.16 |
| 4,207,463 | 6/1980 | Iyeta | 250/231 SE |
| 4,368,958 | 1/1983 | Buget | 351/204 |
| 4,434,654 | 3/1984 | Hulsing, II et al. | 73/151 |
| 4,461,574 | 7/1984 | Shaw et al. | 356/350 |
| 4,483,617 | 11/1984 | Matsumura et al. | 356/350 |
| 4,546,463 | 10/1985 | Opheij et al. | 369/110 |
| 4,614,040 | 9/1986 | Hulsing, II et al. | 33/312 |
| 4,672,752 | 6/1987 | Hulsing, II et al. | 33/302 |
| 4,682,024 | 7/1987 | Halldorsson et al. | 250/225 |
| 4,688,934 | 8/1987 | Clark | 356/34 |
| 4,725,145 | 2/1988 | Azzam | 356/367 |
| 4,773,753 | 9/1988 | Hirose et al. | 356/35.5 |
| 4,818,881 | 4/1989 | Tanton et al. | 250/338.1 |
| 4,836,679 | 6/1989 | Bartholomew | 356/364 |
| 4,849,623 | 7/1989 | Osaki et al. | 250/225 |
| 4,850,711 | 7/1989 | Sano et al. | 356/382 |
| 4,868,385 | 9/1989 | Nishimura | 250/231 SE |
| 4,874,245 | 10/1989 | Spillman, Jr. et al. | 356/364 |
| 4,902,888 | 2/1990 | Kondo | 250/227 |
| 4,912,059 | 3/1990 | Newman et al. | 435/291 |
| 4,922,095 | 5/1990 | Gergely | 250/227.17 |
| 4,958,072 | 9/1990 | Hofler et al. | 250/231.13 |
| 5,073,711 | 12/1991 | Brininstool et al. | 250/225 |

OTHER PUBLICATIONS

Claret, René, "Dispositifs de Detection de Faibles Deplacements Angulaires", *Optics in Metrology*, Colloquia of the International Commission for Optics, Pergamon Press, 1960, pp. 153–166.

*Primary Examiner*—David C. Nelms
*Assistant Examiner*—Que T. Le
*Attorney, Agent, or Firm*—Weingarten, Schurgin, Gagnebin & Hayes

[57] ABSTRACT

An angular position transducer which determines rotation of a shaft from zero to 360 degrees using a polarized disc with coded tracks, a light source and light detector, and various processing devices to convert an analog signal generated by polarizing light into a discrete output signal.

8 Claims, 5 Drawing Sheets

ANGULAR POSITION SENSOR USING A POLARIZED DISC WITH CODED TRACKS

FIELD OF THE INVENTION

The present invention relates generally to an apparatus for sensing angular displacement and, more particularly, to a polarized light position transducer.

BACKGROUND OF THE INVENTION

Remote and electronic sensing of angular displacement, for example, for determining wind direction in remote locations, requires a rotation angle sensor capable of 360° of rotation, nearly infinite resolution, high reliability in a corrosive environment, low inertia and no limit to the number of rotations possible. In order to keep costs low, when used for consumer instrumentation, it is also important to minimize the amount of signal processing necessary between the rotating element and signal display.

One form of rotating shaft/angular position to electrical signal converter is the rheostat or potentiometer. This device provides an electrical output proportional to angular position of the shaft. This device, however, may be unreliable in many applications.

The present invention provides an angular displacement transducer having all the desired features noted above.

SUMMARY OF THE INVENTION

The present invention contemplates an angular displacement transducer having a polarizing disc fixedly mounted on a rotatable shaft between a source of light having a first polarizer and a first light sensor. Since the intensity of the light transmitted through the polarizing disc is proportional to the square of the cosine of the angle between the axis of polarization of the polarizing disc and the axis of polarization of the source polarizer, when the polarizing disc is rotated through 360 degrees the sensor will indicate a minimum value at 90 and 270 degrees, a maximum value at 0 and 180 degrees, and have substantially infinite resolution between these minimum and maximum values. Optional light sensors and sources provide an encoded indication of the disc quadrant orientation. With disc quadrant identification, a unique output signal is generated for each angular position throughout the 360 degree range. The signal from the polarized light sensors may be linearized and further processed in a microprocessor as desired

DESCRIPTION OF THE DRAWINGS

Other features and benefits of the invention can be more clearly understood with reference to the specification and the accompanying drawings in which.

DETAILED DESCRIPTION OF PREFERRED EMBODIMENT

Figure 1:
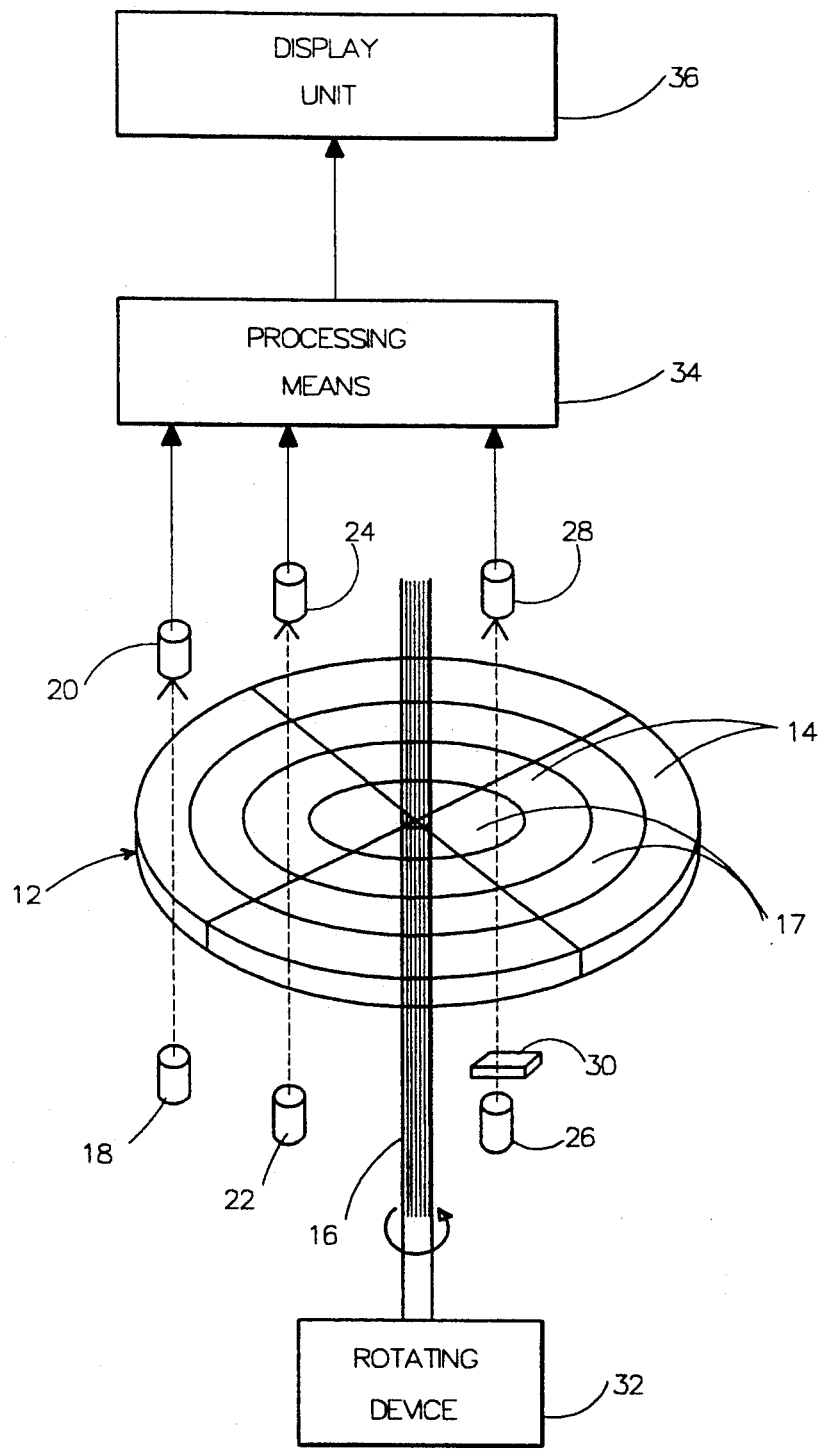
FIG. 1 is a perspective view of a embodiment of the invention.

With reference now to FIG. 1, in brief overview, a schematic illustration of an embodiment the polarizing angular position sensor of the invention is shown, wherein a polarizing disc 12, incorporating digital encoding tracks 14, is fixedly mounted to a rotatable shaft 16. Three light sources 18, 22, 26 are paired with corresponding sensors 20, 24, 28 located opposite each respective light source 18, 22, 26 and adjacent the opposite surface of the disc 12. Hereinafter, the pairs of light sources 18, 22, 26 and sensors 20, 24, 28 will be referred to as a first pair 19 (source 18 and sensor 20) a second pair 23 (source 22 and sensor 24), and a third pair 27 (source 26 and sensor 28). The third pair 27 also includes a stationary polarizer 30 positioned between the light source 26 and the disc 12, such that light from the source 26 must pass through both the stationary polarizer 30 and the disc 12 before being received by its paired sensor 28.

The shaft 16 is mechanically coupled to a rotating device 32, such as a wind vane or any number of various rotating devices whose angular position is to be measured. Rotation of the disc 12 and shaft 16 causes signals to be generated by each of the sensors 20, 24, 28. These signals are analyzed by a signal processor 34 to determine the angular displacement of the disc 12 and shaft 16. The processed signal is then conveyed to, and presented on, a display unit 36.

Figure 2:
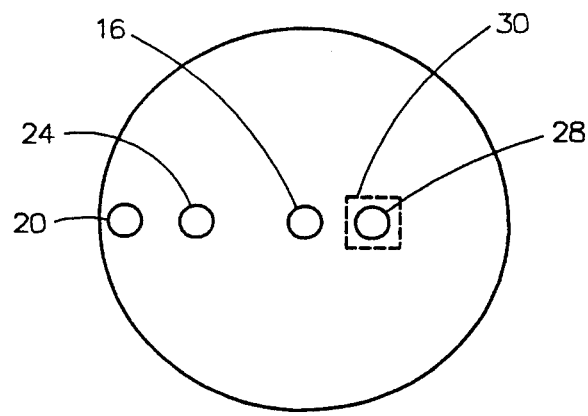
FIG. 2 is a top view of the embodiment of FIG. 1 showing the positioning of the sensors relative to the rotating disc.
Figure 3:
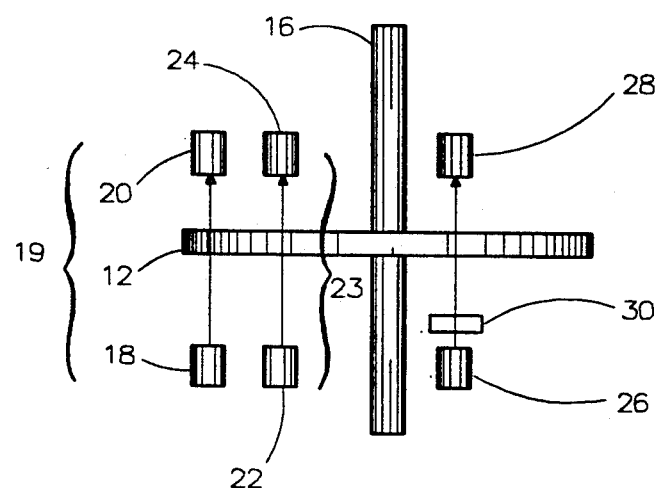
FIG. 3 is a side view of the embodiment of FIG. 1 which further shows the relative positions of components of the device.
Figure 4:
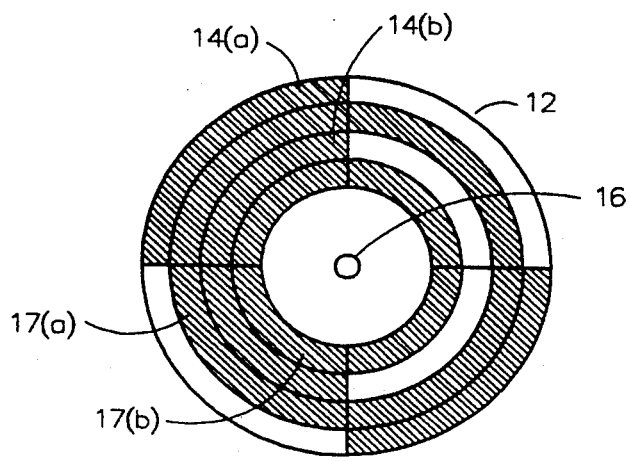
FIG. 4 is a top view of the embodiment of FIG. 1 showing the quadrant differentiation of the rotating disc.

FIGS. 2 and 3 disclose the positioning of the sensors 20, 24, 28 and light sources 18, 22, 26, as well as the stationary polarizer 30, relative to the disc 12 and shaft 16. FIG. 4 depicts the disc 12 in greater detail. The disc 12, made of a linear polarizing material (called a polarizer), is divided into four quadrants: 0° to 90°, 90° to 180°, 180° to 270°, and 270° to 360°. Two binary code tracks 14(a) and 14(b) serve to uniquely identify the quadrants. In the embodiment shown, the two code tracks 14(a), 14(b), the first and third tracks, respectively, counting inward from the circumference, are separated by the second track inward from the circumference, a guard track 17(a). Another guard track 17(b) is the fourth track in from the circumference.

Portions of each binary code track 14(a), 14(b) are opaque and portions are clear. The guard tracks 17(a), 17(b) are opaque. The guard tracks 17(a), 17(b) prevent light from one source, which is destined for the source's corresponding sensor, from being viewed by an adjacent sensor. These guard tracks 17(a), 17(b) reduce the precision by which the sources and sensors 20, 24 must be aligned. The necessity of the guard tracks 17(a), 17(b), therefore depends upon the precision of the alignment of the tracks 14, 17, the disc 12, the sources 18, 22, 26 and sensors 20, 24, 28. The requirement of guard tracks 17(a), 17(b) also is determined by the resolution of the sensors 20, 24.

In operation, light from the sources 18, 22 passes through both the first 14(a) and third 14(b) binary code tracks and is simultaneously viewed by sensors 20, 24, respectively. Each track 14(a), 14(b) within a given quadrant is either opaque or clear, and therefore, each sensor 20, 24 viewing the quadrant produces a signal which is related to the transparency of the track it is viewing. The signal from each sensor corresponds to one bit of information. The two bit word formed from the simultaneous generation of the two sensor signals is thus capable of uniquely identifying the four quadrants of the disc 12. That is, the two bit word generated by the sensors 20, 24 corresponds to the four possible combinations of transparency/opacity which the tracks 14(a), 14(b) can assume: i.e. clear-clear, clear-opaque, opaque-clear, and opaque-opaque. By assigning one combination of track transparency/opacity to each respective quadrant, the quadrant is uniquely identified. For example, if track 14(a) is clear and track 14(b) is opaque within a given quadrant, that quadrant may be distinguished from a quadrant in which track 14(a) is opaque and track 14(b) is clear.

A greater understanding of the device of FIG. 1 will result from a description of the device in operation. Light emitted from each of the sources 18, 22, 26 passes through the clear portions of the rotating disc 12. Light from the third source 26 passes through a stationary polarizer 30, prior to its passing through the polarizing disc 12 and hence, the amount of light reaching the sensor 28 depends upon the orientation of the axis of polarization of the disc relative to the axis of polarization of the polarizer 30.

As the disc 12 rotates, the intensity of the light received by the third sensor 28 from source 26 will vary as the square of the cosine of the angle of rotation ($\theta$). This is given by the equation:

$$(\theta) = I(\theta) \cos^2(\theta)$$

It can be seen from this equation that the output signal generated by light passing through the disc 12 and the stationary polarizer 30 is unique for any given angle within each 90 degree quadrant. However, since the intensity of light varies as the $\cos^2$ of the rotational angle, the same intensity of light will be generated four times within a 360° rotation; once in each quadrant. For example, the intensity of the light at 30° of rotation will have the same value as the intensity of light at 150°, 210° and 330° of rotation. Therefore, if rotations greater than 90° are to be measured, additional information must be provided to remove the degeneracy in the intensity measurement.

To provide the additional information permitting accurate measurement of rotation beyond 90 degrees, this novel device uses two additional source sensor pairs 19, 23 to read the unique two bit binary code which identifies the quadrant being viewed by the third sensor 28. Note that if a measurement of only 180° of rotation is required, then only one sensor 20 and its corresponding light source 18 are needed to form the one bit binary code required to uniquely identify which of the two 90 degree quadrants, making up the 180 degree semicircle, is being viewed. As mentioned previously, the measurement of only 90° of rotation does not require additional sensors beyond the third sensor 28.

Although in the embodiment shown, photo-optic devices such as light emitting diodes and photodetectors are used for sensing the code tracks 14(a), 14(b), other means of encoding and detection, such as capacitance, transmittance, magnetic, or the like, may be employed to determine disc quadrant.

Having described the means for generating signals of various strength for reception by the third sensor 28, we turn to the processing of that signal. The output signal of the first 22, second 24 and third 28 sensors is modified by signal conditioning circuits before being transmitted to the signal processor 34. The specific circuits utilized will vary according to the sensors used and may, in fact, be eliminated by the proper choice of sensors.

Figure 5:
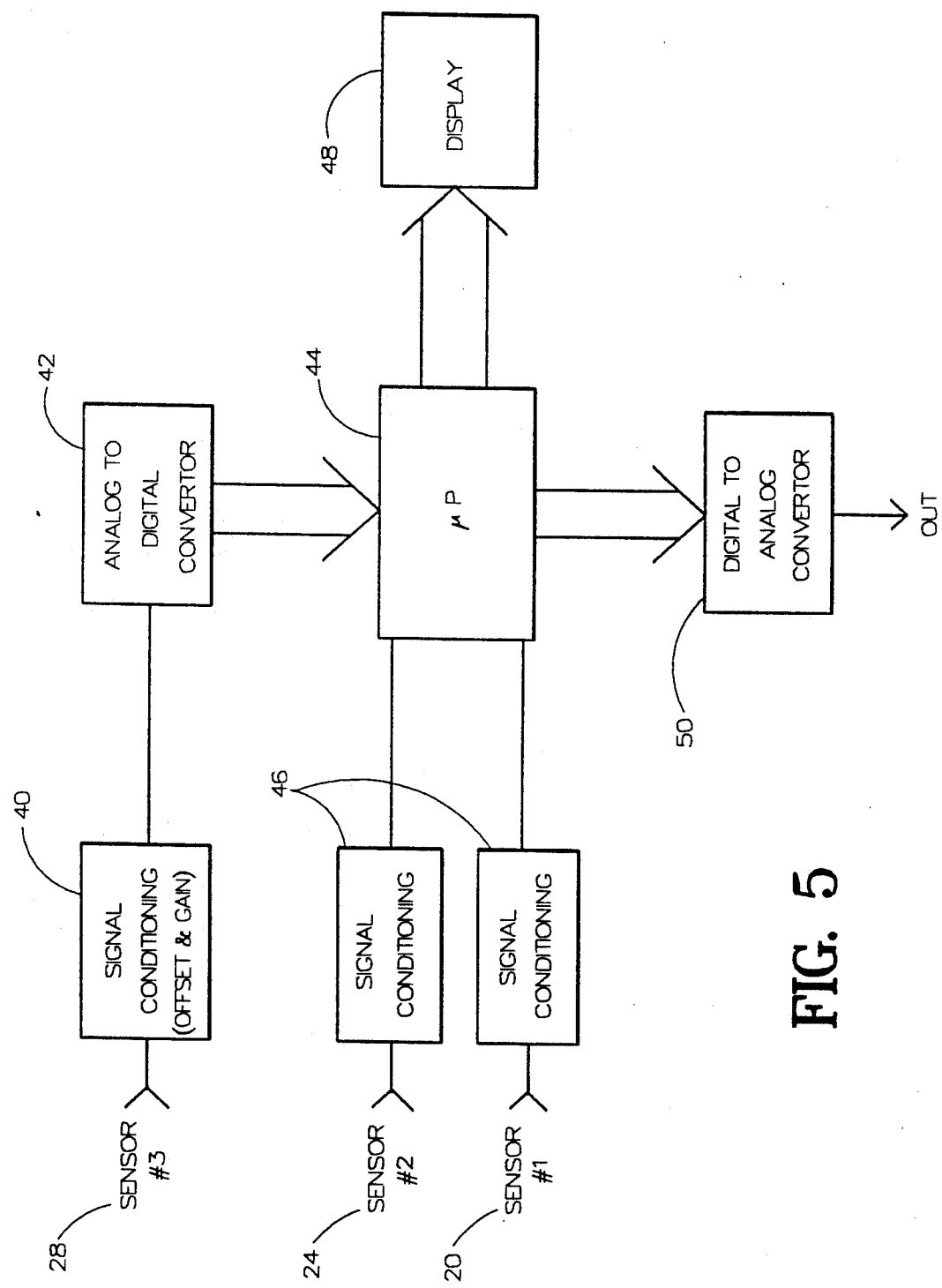
FIG. 5 is a schematic drawing of an embodiment of an interface device used to process the output signal from the embodiment of the invention shown in FIG. 1.

In a first embodiment, illustrated schematically in FIG. 5, the output signal from the signal conditioning circuit 40 for the third sensor 28 is converted by an analog to digital (A/D) converter 42 into a digital value which in turn is transmitted to a microprocessor 44. The output signals from the signal conditioning circuits 46 for the first sensor 20 and the second sensor 24 are single bit binary signals which are transmitted directly to the microprocessor 44 to provide the microprocessor 44 with information as to which quadrant the third sensor 28 is viewing. The microprocessor 44 can display the data on display device 48 and/or transmit the digital signal to a digital-to-analog (D/A) converter 50 to provide an analog linear output representation of the angle measured.

Figure 6:
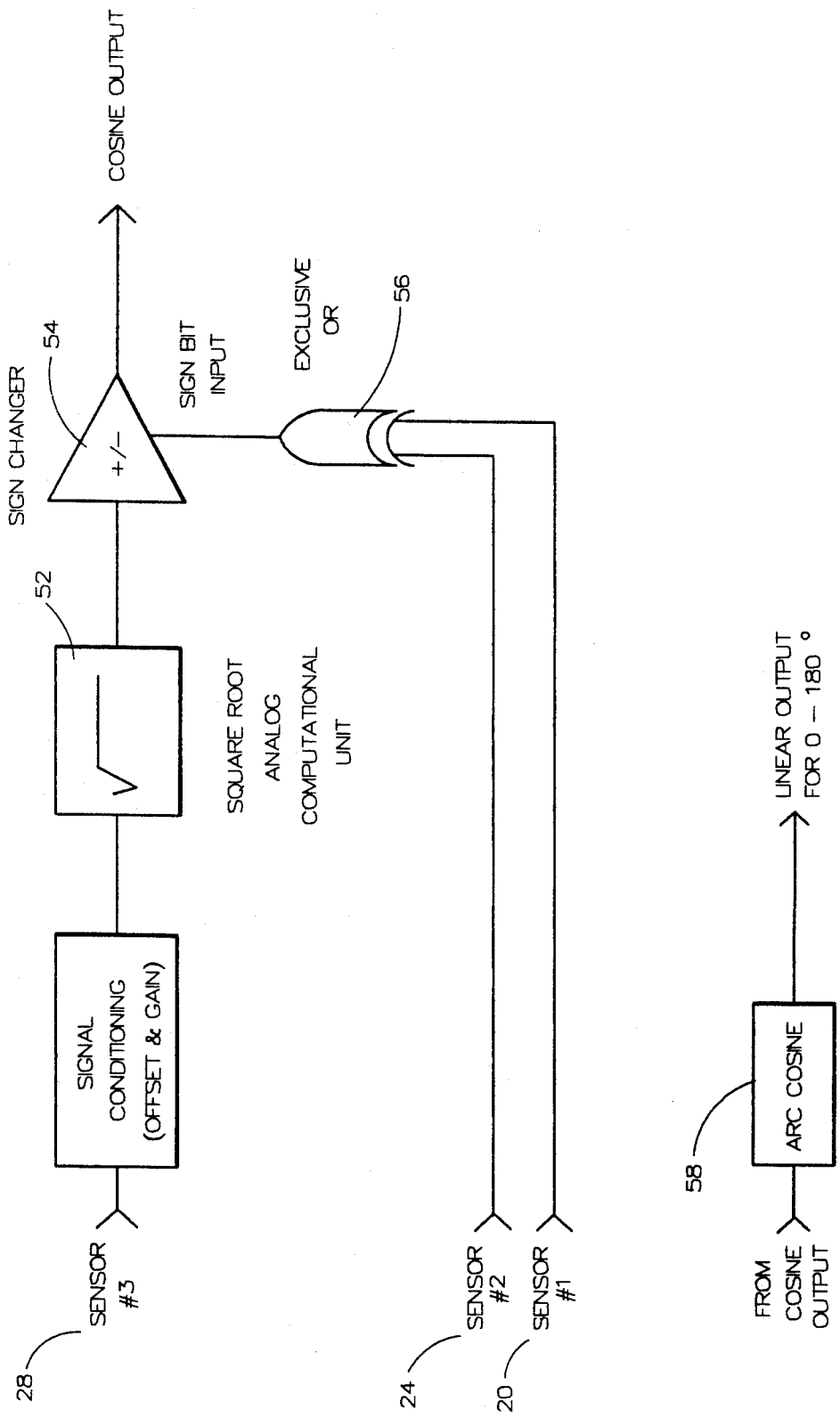
FIG. 6 is a schematic drawing of another embodiment of an interface device used to process the output signal from the embodiment of the invention shown in FIG. 1.

In a second embodiment, shown in FIG. 6, the conditioned signal from the third sensor 28, is communicated to an Analog Computational Unit 52, in this embodiment an AD538, configured for performing square root operations. The signal is then transmitted to a digitally controlled sign changer/amplifier circuit 54. The output signals from the first and second sensors 20, 24 are the input signals to an exclusive OR gate 56 which controls the sign changer 54. The resulting signal is the analog representation of the cosine of the measured angle. The cosine output can then be passed through a trigonometric function converter 58, in this embodiment an AD 639, configured for an arc cosine operation. This converter 58 produces a linear output for a range of 0 to 180 degrees of angular difference.

Figure 7:
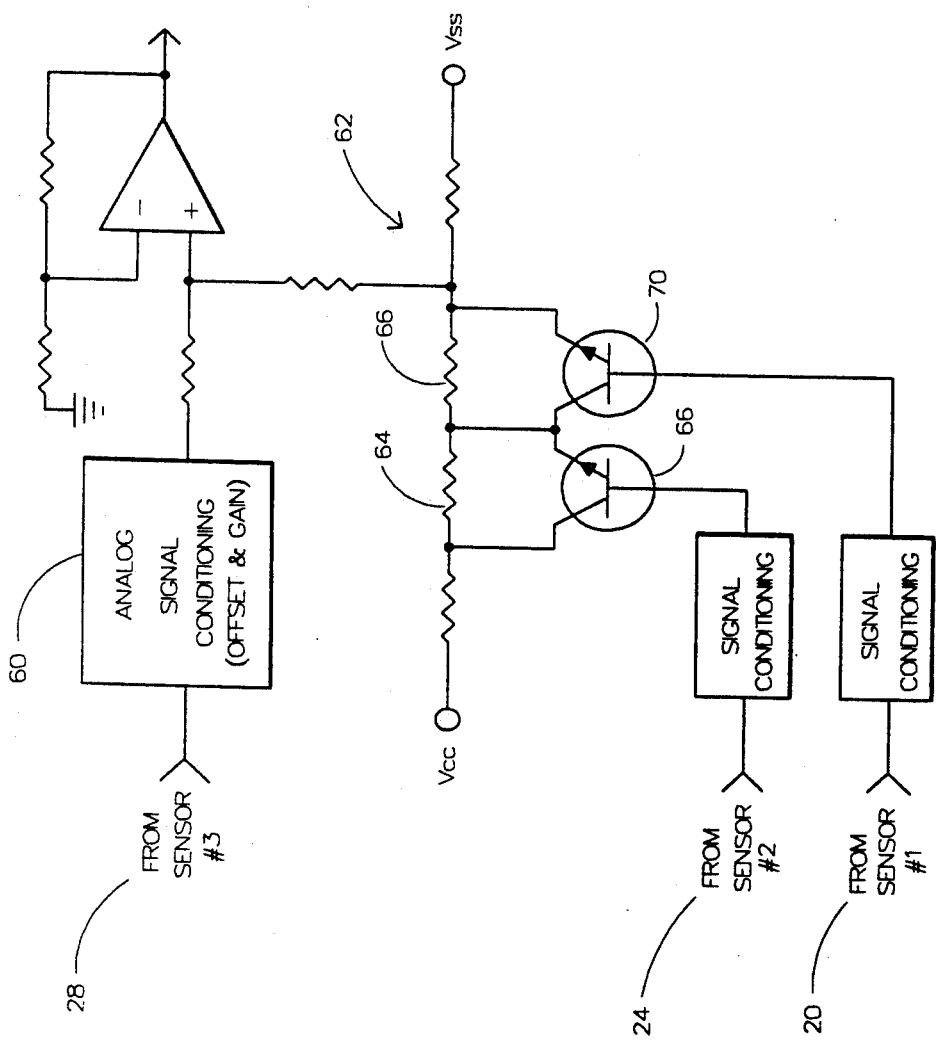
FIG. 7 is a schematic drawing of still another embodiment of an interface device used to process the output signal from the embodiment of the invention shown in FIG. 1.

In a third embodiment, shown at FIG. 7, the signal from the third sensor 28 is the input signal to an amplifier circuit with adjustable offset 60. The first and second sensors 20, 24 control the amount of offset by shorting out resistors 64, 66, by means of transistors 66, 70, respectively, in the $V_{cc}$ to $V_{ss}$ divider circuit 62. Proper selection or resistor values will yield a signal that is unique for each point in the measured 360 degree rotation.

The polarizing angular position transducer of the present invention permits electronic monitoring of angular displacement and provides substantially infinite resolution over a complete 360 degree span. These and other examples of the concept of the invention illustrated above are intended by way of example, and the actual scope of the invention is to be determined solely from the following claims.

It is claimed:

1. A system for electronically sensing an angular position of a shaft using polarized light, comprising:
    a first linear polarizer having a predetermined axis of polarization and fixedly attached to said shaft, said first polarizer being divided into quadrants and having a plurality of encoding tracks which uniquely identify each quadrant;

a second linear polarizer having a predetermined axis of polarization and mounted adjacent to said first polarizer;

a light source for passing a beam of light through said first and said second polarizers;

a sensor for detecting the intensity of said beam of light passing through said first and said second polarizers and for producing a first output signal in response thereto;

a processor for processing said first output signal from said sensor to provide an output signal indicative of the angular position of the shaft; and a display to represent said second output.

2. The system of claim 1 wherein the output signal representative of the angular position of the shaft is related to the angular difference ($\theta$) between the axes of polarization of said first and said second polarizers and wherein said first output signal varies according to the following equation:

$$I(\theta) = I(\ ) \cos^2(\theta)$$

wherein I(0) is the intensity of light passing through said first polarizer.

3. The system of claim 1, wherein said system further comprises a second sensor in communication with said processor to generate a quadrant detection signal from said encoding tracks which uniquely defines said quadrant.

4. The system of claim 3 wherein said first and said second sensors are photo detectors.

5. The system of claim 1, wherein said light sources is a light emitting diodes.

6. The system of claim 1, wherein said processor comprises an interface unit comprising a signal conditioning circuit in communication with an analog to digital converter.

7. The system of claim 1, wherein said processor is an interface unit comprising:

a signal conditioning circuit, wherein a output signal is conditioned;

an analog computational unit, in communication with said signal conditioning circuit, for performing square root operations on said conditioned output signal;

a sign changer, in communication with said analog computational unit and at least one other sensor for viewing the encoded tracks, for converting said square root of said conditioned output signal to a cosine signal;

and a trigonometric function converter, in communication with said sign changer, for generating a linear output signal from said cosine signal for angular displacements between 0 and 180 degrees.

8. The system of claim 1, wherein said processor for processing said first output signal comprises an amplifier circuit with adjustable offset having said first output signal as an input signal, said amplifier circuit being controllable by at least one additional sensor which produces an offset by shorting out resistors in a divider circuit to provide said output signal of said processor having a unique output value corresponding to said output signal.

* * * * *